United States Patent [19]
Yagi et al.

[11] 3,957,190
[45] May 18, 1976

[54] CASSETTE TAPE LOADING APPARATUS

[75] Inventors: Motoi Yagi, Zushi; Satoshi Hara, Kanagawa, both of Japan

[73] Assignee: Tokyo Shibaura Electric Co., Ltd., Kawasaki, Japan

[22] Filed: Oct. 9, 1974

[21] Appl. No.: 513,233

[30] Foreign Application Priority Data
Oct. 18, 1973  Japan.............................. 48-117303

[52] U.S. Cl.................................. 226/89; 226/91
[51] Int. Cl.².......................................... G03B 1/56
[58] Field of Search ............. 226/89, 90, 91; 360/95

[56] References Cited
UNITED STATES PATENTS 3,688,059  8/1972  Miura .............................. 226/91 X
3,833,921  9/1974  Kihara ............................ 360/95 X

*Primary Examiner*—Richard A. Schacher
*Attorney, Agent, or Firm*—Oblon, Fisher, Spivak, McClelland & Maier

[57] ABSTRACT

Apparatus includes a support with a bucket for receiving a tape cassette, the support being swingable to a position in which the part of a tape is delivered from the cassette so as to be inserted into a tape travelling path of a tape travelling device. The delivering operation of the tape is automatically performed by the movement of the support.

5 Claims, 8 Drawing Figures

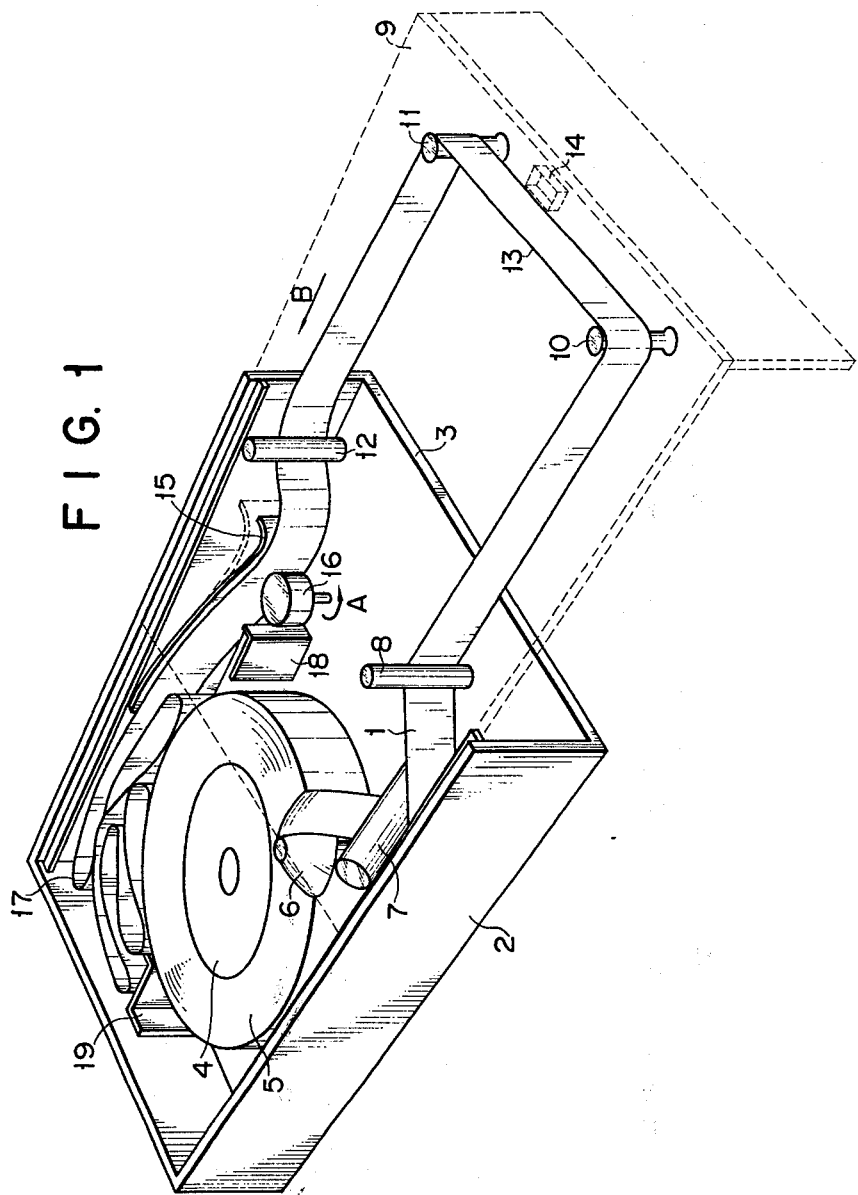

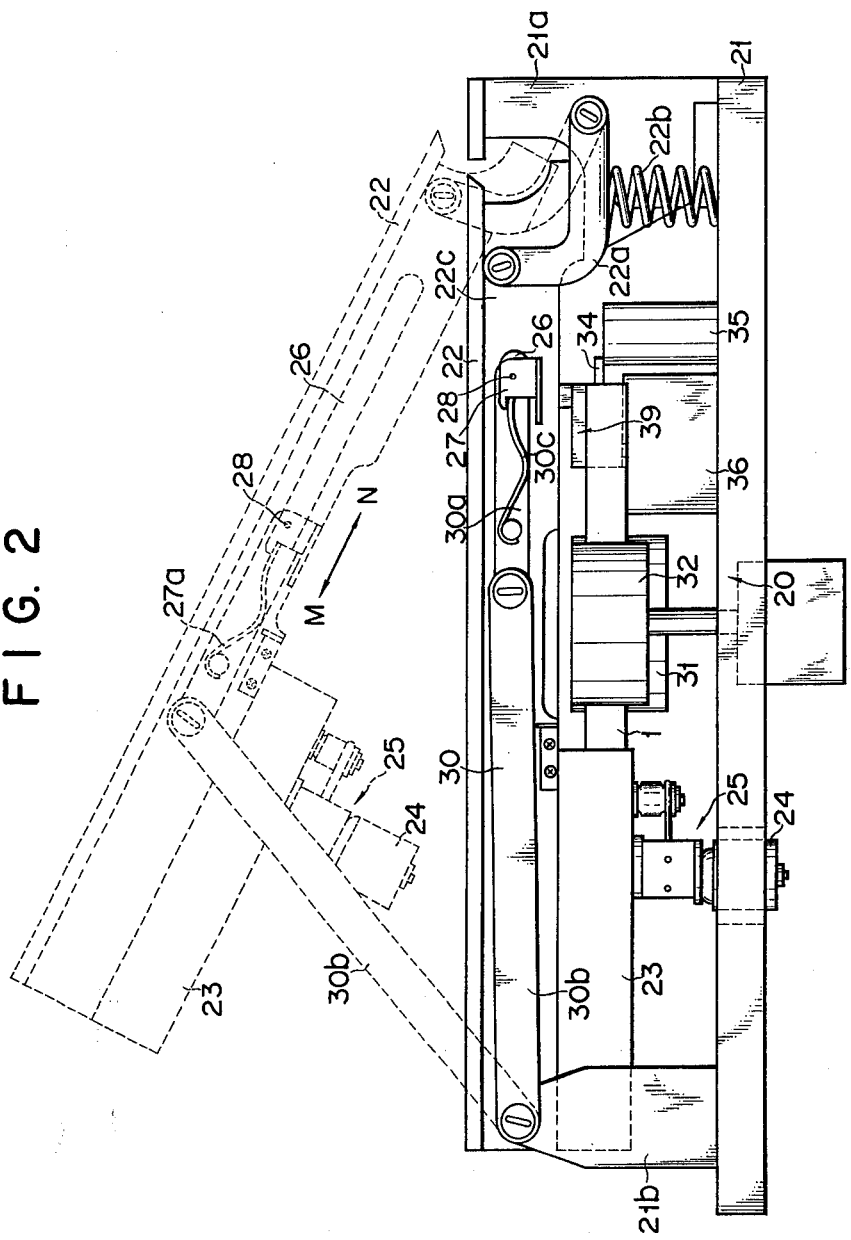

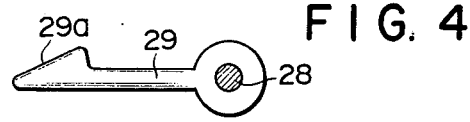
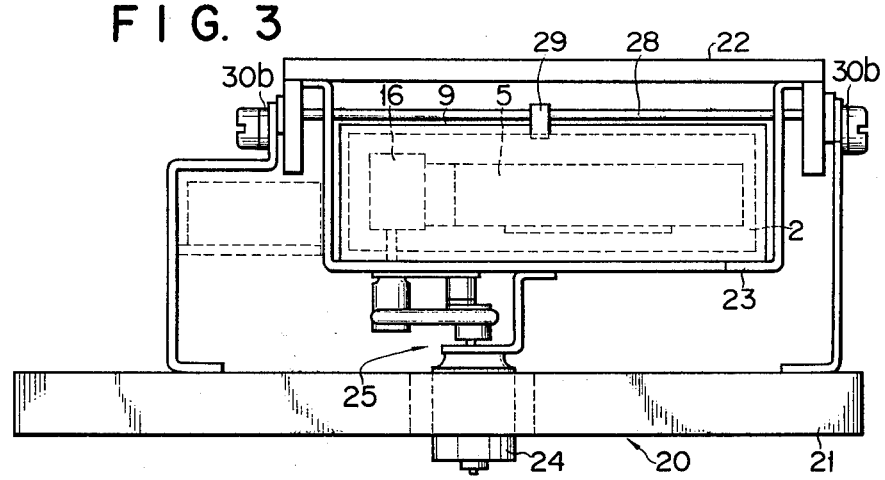
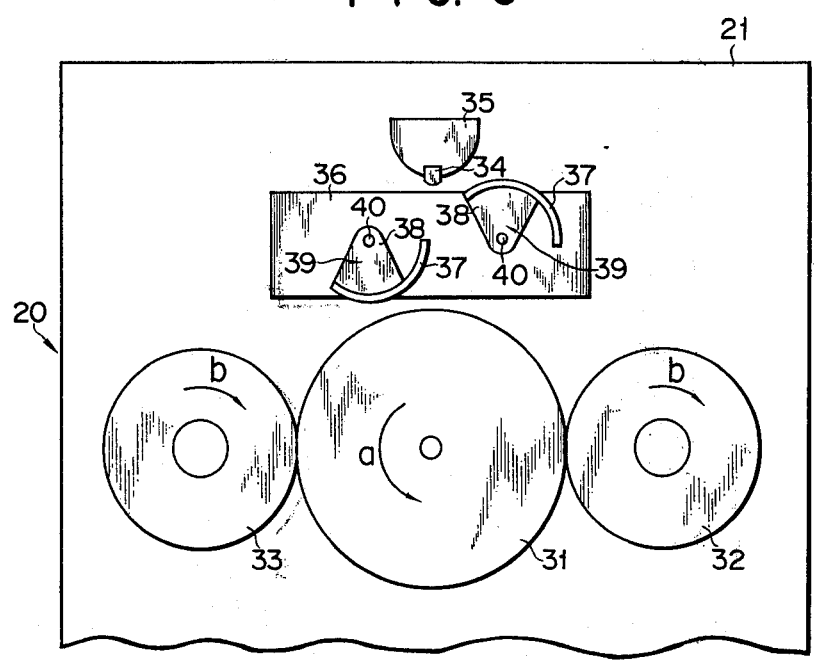

CASSETTE TAPE LOADING APPARATUS

This invention relates to apparatus and, in particular, to a tape loading device for receiving a cassette tape and delivering a tape out from a cassette for travelling on the tape travelling device.

A video tape recorder (VTR) is generally used as a device for recording and reproducing video signals such as TV signals. A conventional video tape recorder adapted to record and reproduce video signals through a rotary type magnetic head requires a servo mechanism for tracking and, furthermore, a rotary head mechanism and a tape travelling mechanism are complicated in construction. This provides a bar to the simplification and miniaturization of the video tape recorder, resulting in an extremely high cost.

To obviate the above-mentioned drawbacks, there has been considered a device for recording and reproducing video signals using an endless tape and a stationary magnetic head. In this device, the tape needs to be stably, conveyed at a high rate of speed of more than 3m per second. A tape travelling mechanism used in this case is different from a low-speed tape travelling mechanism for an acoustic signal recording and reproducing device and is constructed, for example, as set out below. An endless tape wound around a reel is delivered from the innermost periphery of the tape roll. The tape passed between the capstan and the inlet pinch roller is scanned by a stationary magnetic head while guided along a guide disposed opposite to the magnetic head.

Where the tape is embodied in a cassette form, it is impossible in the above-mentioned tape travelling apparatus to provide the pinch roller on the cassette in view of its stable tape travel and simple construction, unlike a tape travelling apparatus for acoustic signals. For this reason it is required that, upon loading the cassette tape onto a tape travelling device, part of the tape be delivered out so that it can be inserted into a tape travelling path between a magnetic head and a head facing guide.

It is accordingly the object of this invention to provide a cassette tape loading apparatus capable of delivering part of a tape out from a cassette and loading the tape onto a tape travelling path of a tape travelling device with a high degree of accuracy and by a simple operation.

The cassette loading apparatus according to this invention proves advantageous if it is applied to a tape travelling device in which a tape is delivered out, as in a VTR, from the cassette and loaded onto a tape travelling path so that it is scanned by a magnetic head.

This invention can be more fully understood from the following detailed description when taken in conjunction with the accompanying drawings, in which:

FIG. 1 is a perspective view showing one example of a cassette tape to be loaded on a cassette loading apparatus according to this invention;

FIGS. 2 and 3 show a cassette loading apparatus according to one embodiment of this invention wherein FIG. 2 is a side view and FIG. 3 is a front view;

FIG. 4 is a side view showing, on a large scale, an engaging member used in the cassette loading apparatus;

FIG. 5 is a plan view showing a tape travelling device into which the cassette loading device is incorporated;

Figure 6:
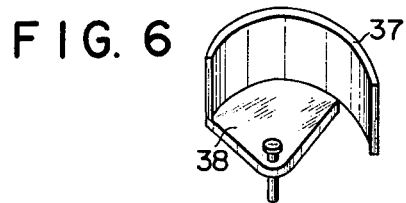
FIG. 6 is an enlarged, perspective view showing a guide member used in the tape travelling device of FIG. 5.

FIG. 1 shows one example of a cassette tape. An endless tape 1 may be, for example, a magnetic tape and is wound around a reel 4 rotatably mounted on a bottom substrate 3 of a case body or cassette 2. The tape 1 is so driven by the following mechanism that it is delivered from the innermost periphery of a tape roll 5 and wound around the outermost periphery of the tape roll. The tape delivered from the innermost periphery of the tape roll 5 is guided through a conical guide roll 6, a guide pole 7 obliquely mounted on the substrate 3 and a guide pole 8 mounted normal to the substrate 3. The tape from the guide pole 8 is passed, through a pair of guide poles 10, 11 vertically mounted in a spaced-apart relation on the undersurface of the forward end portion of an upper covering 9, to a guide pole 12 which oppositely faces the guide pole 8.

The upper covering 9 is slidably moved relative to the case body 2 so as to cause the cassette to be opened and closed. When the upper covering 9 is drawn out, the tape 1 is delivered out through the pair of guide poles 10, 11 to provide a rectangular tape portion 13 defined by guide poles 8, 10, 11 and 12. At the middle of the forward end portion of the upper covering 9 is provided an engaging section or small recess 14 for drawing out the upper covering 9.

The tape 1 passed through the guide pole 12 is guided between a rotating body 16 and a leaf spring 15 swingably mounted on one side wall of the case 2. The rotating body 16 is made of a pliable material, such as moltprene or sponge rubber, having a relatively great frictional resistance. When the cassette tape is loaded, the rotating body 16 is rotated by a means to be later described. The leaf spring 15 is so mounted that it may be manually or automatically swung, during the loading and unloading of the cassette tape, into a position as indicated by solid lines to cause the tape to be urged into contact with the rotating body 16, and the leaf spring is manually and automatically swung, during the recording and reproducing of signals, into a position as indicated by dotted lines to cause the tape to be moved away from the rotating body. The tape emerging from between the rotating body 16 and the leaf spring 15 has a slackened portion 17 before it is wound on the outermost periphery of the tape roll.

Frame members 18, 19 mounted on the substrate serve to prevent the slackened portion 17 of the tape from being unnecessarily expanded or spread in a horizontal direction.

Let us now explain a tape loading apparatus according to the embodiment by reference to FIGS. 2 to 4 of the present invention.

A projection 21a is mounted on the forward end portion of a base 21 of a tape travelling device 20. A rectangular support plate 22 of a support member is so mounted on the projection 21a that during an operative period of time it can be disposed parallel to the base 21 as indicated by solid lines in FIG. 2. A pair of L-shaped arms 22a have one end pivotally connected to the projection 21a and the other end pivotally connected to the cassette support plate. As a result, the cassette support plate is swingable with said one end of the L-shaped arm 22a as a center. Between the arm 22a and the base 21 a compression spring 22b is disposed so that the cassette support plate can be smoothly swung in a clockwise direction. A rectangular-shaped bucket 23 is mounted on the undersurface of the cassette support plate 22 near the free end thereof in a manner to be parallel to the upper surface of the cassette support. A cassette is inserted into the bucket 23 through the opening formed in the rear side thereof. On the cassette support plate 22 is mounted a driving mechanism 25 having a motor 24 so that when the cassette is loaded into the bucket 23, the rotating body 16 is caused to be rotated by the driving mechanism 25. The support member has a pair of longitudinally extending side plates 22c integrally secured to the undersurface of the cassette support plate 22. The side plates each have an elongated hole 26 extending in the longitudinal direction of the side plate. A crossbar 28 is extended across the width of the cassette support and opposite ends thereof are projected through the elongated holes 26 of the side plates. A pair of sliders 27 are connected one at each end of the crossbar 28. The sliders 27 and thus the crossbar 28 are movable as a unit along the elongated holes 26 of the side plates 22c. At the middle of the crossbar 28 is mounted an engaging member or claw member 29 as illustrated in detail in FIG. 4. When the cassette tape is loaded into the bucket 23, the engaging member 29 is brought into engagement with the engaging recess 14 of the upper covering 9.

To the sliders 27 are connected a pair of operating members 30 for moving the slider 27 along the elongated hole 26 of the side plate of the cassette support 22 when the support 22 is swung. The operating member 30 comprises a first arm 30a having a bored end portion through which the end of the crossbar 28 is loosely fitted and extending along the longitudinal direction of the cassette support 22 and a second arm 30b having one end pivotally connected to the other end of the arm 30a and the other end pivotally connected to a projection 21b mounted upright on the rear end portion of the base 21. On the arm 30a is mounted a leaf spring 30c for urging the slider 27 in a clockwise direction. Consequently, the engaging member 29 secured to the crossbar 28 is urged in a clockwise direction.

This permits the engaging member 29 to be positively engaged with the recess 14 of the upper covering 9. The engaging member 29 has an inclined surface 29a at its forward end. When the cassette is inserted into the bucket, the forward end of the upper covering 9 is contacted with the inclined surface 29a of the engaging member 29 to cause the member 29 to be temporarily swung against the urging force of the leaf spring 30c to permit the engaging member 29 to be engaged with the recess 14 of the upper covering 9.

The tape travelling mechanism will be explained by reference to FIGS. 5 and 6.

On the base 21 are provided a capstan 31 driven at a constant speed in a direction indicated by an arrow a in FIG. 5 by virtue of a motor housed in a case fixed to the base 20, and inlet and outlet pinch rolls 32 and 33 are rotated in a direction b opposite to that of the capstan. During the tape travelling time, the pinch rolls 32 and 33 are moved into contact with the capstan through the tape while, during the cassette loading time, the pinch rolls 32 and 33 are moved by a predetermined distance away from the capstan so that the tape can be easily inserted into the tape travelling path between the capstan and the pinch rolls. It is convenient to swing the leaf spring 15 relative to the rotating body 16 in synchronism with the movement of the pinch roll.

Figure 7A:
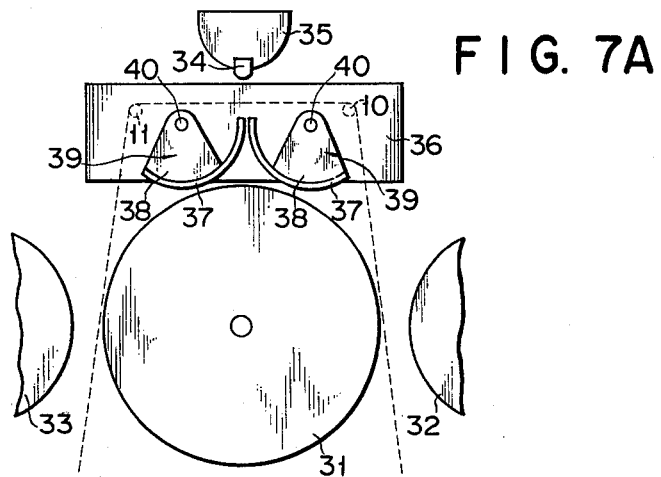
FIGS. 7A and 7B are plan views schematically showing unoperative and operative positions, respectively, of the tape travelling device.
Figure 7B:
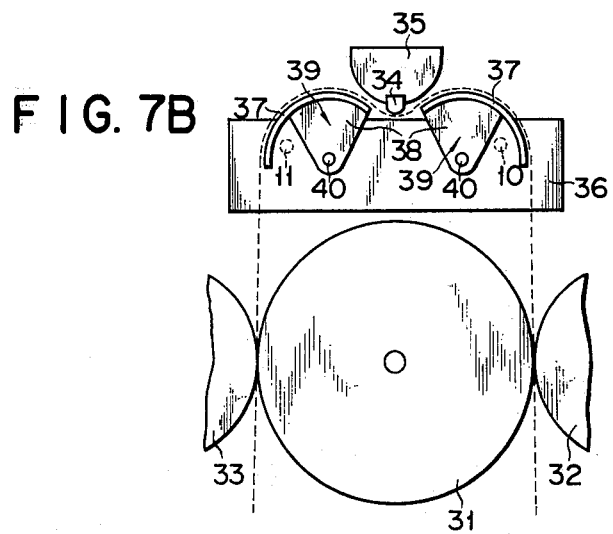

A head block 35 is mounted on the base 21 in a manner to confront the capstan 31 and has a magnetic head 34 mounted thereon. It is very convenient to mount the head block 35 on the base 21 in a manner to be movable in a direction vertical to the base 21, i.e., across the width of the tape. Between the capstan 31 and the magnetic head 34 is mounted a tape supporting base 36 for supporting the lower edge of the tape. A pair of rotatable guides 39 are mounted at a predetermined interval on the tape supporting base and are each rotatable with a rotation axis 40 as a center. As shown in detail in FIG. 6, the rotatable guide 39 has a sector plate 38 whose rotation axis is riveted, and a guide surface or upright curved plate 37 mounted on the outer periphery of the sector plate 38. When the guide plate 39 is swung into a first position shown in FIG. 7B in which the guide surface 37 is located close to the head block 35, one end of the guide surface 37 is positioned in the same plane as the forward end of the magnetic head or extends slightly on the magnetic head 34 side. When the guide surface 37 is swung through 180° into a second position as shown in FIG. 7A, a predetermined space is left between the rotatable guide 39 and the magnetic head 34. It is convenient to provide a suitable synchronizing means by which the rotatable guide is so operatively associated with the pinch rolls 32 and 33 that, when the rotatable guide 39 is swung from the second position to the first position, the pinch rolls 32 and 33 are moved toward the capstan 31.

Let us now explain the case where the cassette tape is inserted into the tape loading apparatus of FIGS. 2 and 3, and the tape in the cassette is delivered from it to be inserted into the tape travelling path of the device shown in FIG. 5.

The rotatable guide 39 is swung into the second position as shown in FIG. 7A in which the guide surface 37 of the rotatable guide is located close to the capstan 31, and, at the same time, the pinch rolls 32 and 33 are moved away from the capstan 31 so that a wide tape travelling path can be provided. The cassette support 22 of the cassette loading apparatus is swung upward into a first position as indicated by dotted lines in FIG. 2. At this time, the slider 27 and the engaging member 29 are located at the left side of the slot 26 by moving in a direction M. When the cassette is inserted into the bucket 23 with the upper covering 9 closed, the recess 14 of the upper covering 9 is engaged with the engaging member 29. At the same time, the rotating body 16 is operatively connected to the driving mechanism 25 which has already been driven, causing the rotating body 16 to be rotated in a direction indicated by an arrow A in FIG. 1, while the leaf spring 15 is brought into the position as indicated by solid lines in FIG. 1 to urge the tape 1 toward the rotating body 16. As a result, the tape is conducted in a direction indicated by an arrow B in FIG. 1. When the cassette support 22 is swung counter-clockwise into an original position, the slider 27 and the engaging member 29 are moved as a unit along the slot 26 in a direction indicated by an arrow N by virtue of the operating member 30, causing the upper covering 9 to be drawn out from the case 2 with the result that the tape is delivered out, as shown in FIG. 1, by the pair of guide poles 10, 11. When the swinging movement of the cassette support 22 is complete, the delivered portion of the tape is inserted into the travelling path defined between the magnetic head 34 and the guide surface 37 and between the capstan 31 and the pinch rolls 32, 33, which has been widened as already set out above. Since the delivered tape portion 13 is made tense due to the tape 1 being moved in a direction of the arrow B by the coaction of the rotating body 16 and the leaf spring 15, no slackened portion is provided within the tape and the insertion of the tape into the tape travelling path is easily effected.

After the tape 1 is so loaded on the tape travelling path, the rotatable guide 39 is swung through 180° into the first position in which the guide surface 37 is located close to the magnetic head 34. At the same time, the pinch rolls 32 and 33 are moved toward the capstan 31. By the swinging movement of the rotatable guide 39 the delivered tape portion 13 is released away from the guide poles 10 and 11 and into a position as indicated by dotted lines in FIG. 7B where it is contacted with the magnetic head 34. Up to the time when preparation for tape travelling is so complete, the leaf spring 15 is moved away from the tape 1 as indicated by the dotted lines in FIG. 1 and the tape can be smoothly conveyed without any obstacle. By operating the driving switch, not shown, the tape 1 is conveyed under the coaction between the capstan and the pinch roll and scanned at the magnetic head.

Where it is desired to unload the cassette from the bucket, a driving switch is opened, the tape travelling path is broadened and the cassette support is swung clockwise into the position indicated by the dotted lines in FIG. 2. As a result, the engaging member 29 is moved in the direction indicated by the arrow M in FIG. 2 by virtue of the operating arm 30 to cause the upper covering 9 to be moved in the direction indicated by the arrow B in FIG. 1 and the delivered tape portion 13 is housed within the case 2 while being wound on the outer periphery of the tape roll. When in this state the cassette is drawn out from the bucket 23, the engaging member 29 is easily disengaged from the recess 14 of the upper covering to permit the cassette to be removed from the bucket.

The rotating body 16 is rotated and the leaf spring 15 urges the tape toward the rotating body so as to prevent the fall of the delivered tape portion 13, during the swing of the cassette support 22 to move the covering 9.

With the above-mentioned tape loading device it is possible to automatically deliver the tape outward from the cassette and insert the same into the tape travelling path.

Any tape can be employed in the cassette loading device, if the tape can be delivered out from the case by a drawing member, for example, the upper covering 9, which is designed to draw out the tape from the case by suitable means. The cassette tape is not restricted to an endless type.

There may be used two reels which are coaxially mounted. In this case, the tape is fed from one reel and wound around the other reel. The tape is not restricted to magnetic tape. For example, a perforated tape may be used.

There may be used head facing guides which are moved with the pinch rolls to change the width of the tape travelling path.

What we claim is:

1. Apparatus comprising:
    a cassette tape including a case body,
    a tape housed within the case body,
    a member slidably movable relative to the case body,
    a pair of poles fixed to the member to guide the tape and an engaging portion provided upon the member,
    a tape travelling device having a tape driving mechanism and a tape travelling path,
    a bucket for receiving the cassette,
    supporting means mounted on the tape travelling device to be swung between a first position in which the cassette is loaded and a second position in which the tape to be delivered out from the cassette is inserted in the tape travelling path,
    an engaging member movably connected to the supporting means so as to be engaged with the engaging portion of the member, and
    means for moving the engaging member to cause the tape to be delivered out from the cassette through the member when the supporting means is swung from the first position to the second position.

2. A cassette tape travelling apparatus according to claim 1 in which:
    said engaging portion of said member has a recess, and
    said engaging member has an engaging claw and a spring for urging the engaging claw into engagement with the recess.

3. A cassette tape travelling apparatus according to claim 1, wherein: said member is a cover.

4. Apparatus for receiving a cassette tape and for delivering part of said tape from the cassette so as to insert the same within a tape travelling path of a tape travelling device, comprising:
    cassette receiving means supported on the tape travelling device to be swingable between a first position in which the cassette is loaded thereon in an inclined state to the tape travelling path and a second position in which the cassette is parallel with the tape travelling path and the part of the tape delivered out from the cassette is inserted in the tape travelling path,
    delivering means mounted on the cassette receiving means to be associated with the tape of the cassette loaded on the cassette receiving means,
    operating means connected to the delivering means and moving said delivering means to cause the part of the tape to be drawn from the cassette when said cassette receiving means is swung from the first position to the second position,
    said cassette receiving means including a support swingable between said first and second positions, a bucket mounted at one end of said support to receive the cassette, a member pivotally connecting the other end portion of said support to said tape travelling device body, and slots extending longitudinally of said support,
    said delivering means includes an engaging claw for delivering the tape from the cassette, a bar connected to said support with its ends passed through the slots and the support, and a pair of sliders fixed to the ends of the bar, and
    said operating means includes a first arm having one end pivotally connected to the slider and a second arm having one end pivotally connected to the other end of said first arm and the other end pivotally connected to said tape travelling device,
    whereby, when said cassette receiving means is swung, the second arm is swung with the other end as a center to cause the slider to be moved along the slot to permit the engaging claw to be moved.

5. Apparatus according to claim 4 in which said tape travelling device includes a rotatable capstan, a pair of pinch rolls oppositely facing the capstan, and a tape scanning member and said tape travelling path is defined between the capstan and the pinch rolls and between the capstan and the tape scanning member.

* * * * *